April 28, 1942.        W. C. ANDERSON        2,281,221
BUS BAR DUCT CONNECTOR
Filed May 18, 1940                 2 Sheets-Sheet 1

INVENTOR
William C. Anderson
BY
ATTORNEY

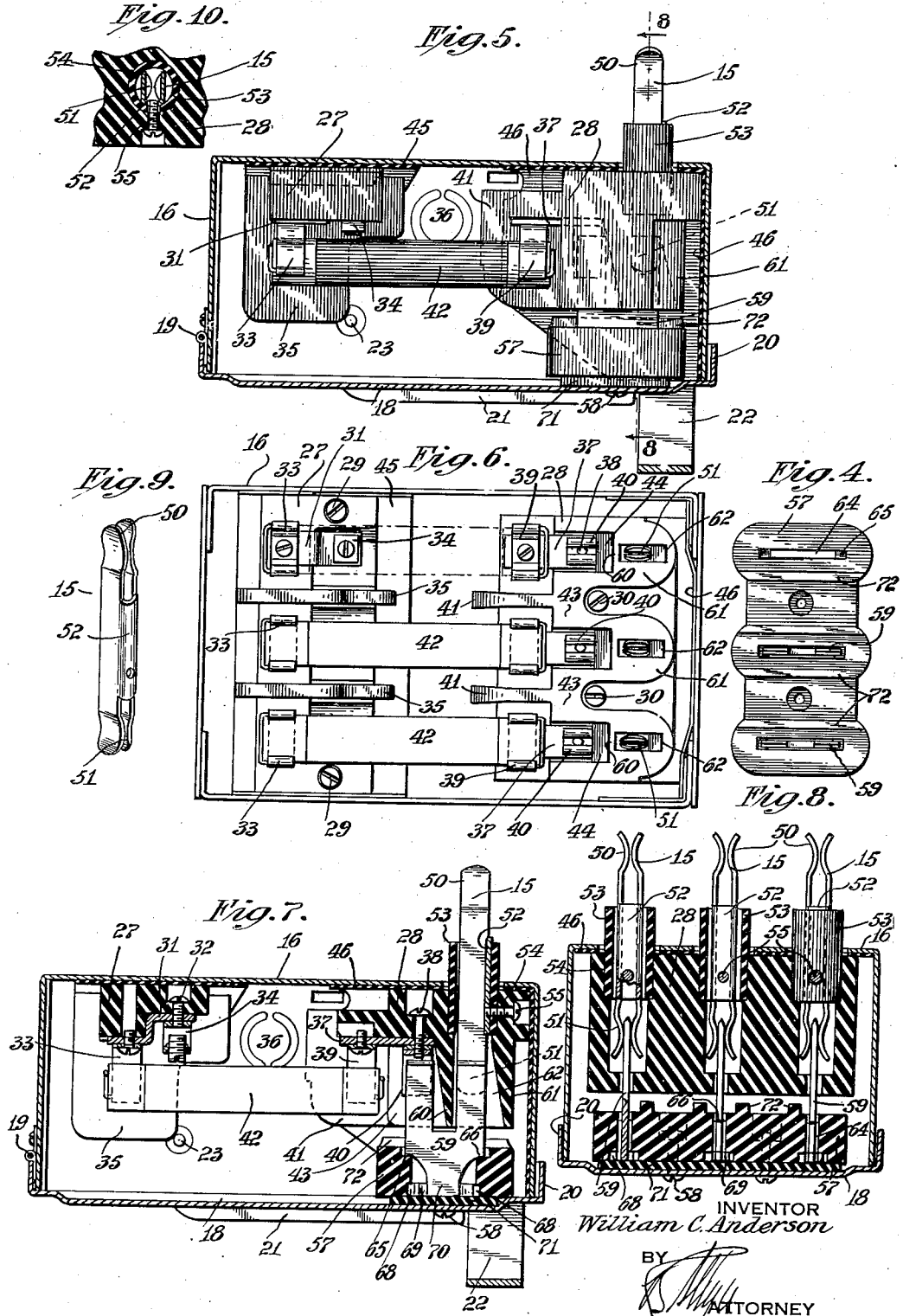

Patented Apr. 28, 1942

2,281,221

UNITED STATES PATENT OFFICE 2,281,221

BUS BAR DUCT CONNECTOR

William C. Anderson, Bromley, Ky., assignor to The Trumbull Electric Manufacturing Company, Plainville, Conn., a corporation of Connecticut Application May 18, 1940, Serial No. 335,876

9 Claims. (Cl. 200—51)

My invention relates to power distribution systems and especially to improvements in a branch circuit distribution box provided with a movable switch member and circuit protecting fuses.

One object is to provide a box which can be readily attached to a bus bar duct.

Another object is to provide a box having a hinged cover and containing fuses and having a switch member carried by the cover.

Another object is to provide a device which is simple, rugged and effective and yet can be made at reasonable cost.

Another object is to provide a box having duplex contact members with simple means for rigidly supporting said contact members in the box.

Another object is to provide a box with a hinged cover having a number of contacts with means for individually adjusting each contact.

Another object is to provide common means for insulating and supporting the contact members.

The box is adapted to be attached to a bus bar duct and has a cover hinged at one end and provided with a lever and handle to facilitate opening. Inside of the box is mounted insulating material which supports pairs of fuse holders and electric terminals. One set of terminals has blades or jaws extending outside the box to engage the bus bars in a duct. These terminals and the adjacent fuse holders have stationary switch contacts adapted to be connected by switch members carried by the cover when the cover is closed. The other set of terminals are for the attachment of the branch circuit conductors which extend from the box to the point where power is to be used. The fuse holders and stationary terminals and contacts are all suitably spaced apart and guarded in recesses in the insulating material. The movable switch members are supported loosely in an insulating block but in such positions that they automatically engage the stationary contacts when the cover is closed. The handle puller is so designed as to afford great leverage in the opening and closing movements of the cover.

It will be understood that these ducts are usually secured to or suspended from the ceiling or overhead trusses and accordingly the invention will be largely described with this arrangement in mind although it is not limited to installation in such a position.

Fig. 4 is a face view of the same, one switch member being omitted.

Fig. 5 is a longitudinal section of the switch box and showing a side view of the interior parts.

Fig. 6 is an inside view, the cover being omitted.

Fig. 7 is a longitudinal sectional and side view, parts being broken away.

Fig. 8 is a cross sectional view on the plane of the line 8—8 of Fig. 5.

Fig. 9 is a perspective view of a combined stationary switch contact and bus bar engaging blade or stab.

Fig. 10 is a cross sectional view of the insulating tube and the enclosed contact member.

Figure 1:
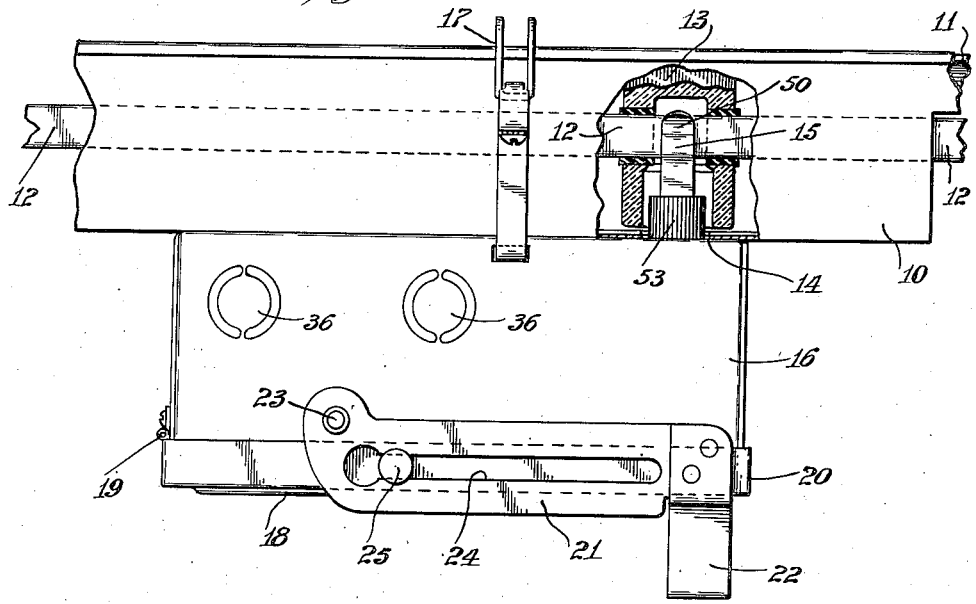
Fig. 1 is a side view of a branch circuit distribution box embodying one form of my invention and showing it attached to a fragment of a bus bar duct system, parts being broken away and parts in section.
Figure 2:
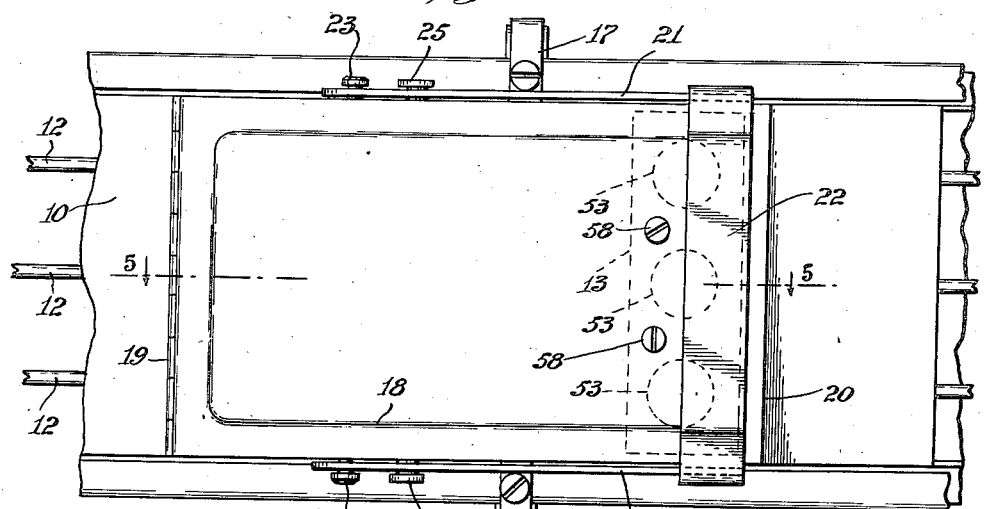
Fig. 2 is a face view of the same.
Figures 3, 3A:
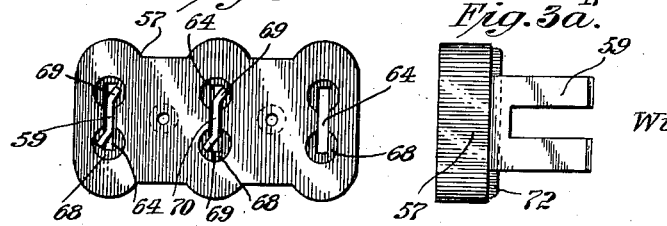
Fig. 3 is a rear view of the block carrying the movable switch members, one switch member being omitted.
Fig. 3a is an end view of the block and switch member.

The duct system may be of any suitable character consisting for instance of a trough shaped member 10 and a top plate 11 suitably secured thereto. Bus bars 12 are suitably supported in the duct for instance by means of insulating blocks 13. The duct is provided with openings 14 at intervals to receive the contact blades or stabs 15 carried by the distribution box 16. This box may be suitably secured to the duct for instance by means of a clamping device 17 as set forth in application Serial Number 327,578 filed April 3, 1940.

The cover 18 of the box is hinged at 19 and preferably has a flange 20 which surrounds the edges of the box. An operating handle for opening and closing the cover consists of levers 21 having a transverse grip portion 22. Each lever of this member is hinged to the body of the box at 23 and has a slot 24 in which a stud 25 carried by the cover extends. This construction makes it possible to apply sufficient force to the cover to open it even if the switch parts are tightly engaged.

The conducting parts are mounted on insulation inside the box. Preferably the supporting insulation is formed of two parts 27 and 28 which may be formed of molded insulation of any suitable character.

The part 27 is secured in the bottom of the box by screws 29 at opposite ends. The block 28 is similarly secured to the bottom of the box by screws 30. Each block is provided with a suitable number of terminals and fuse clips or holders, the form shown herein being intended for a three-wire system as there are three sets of these devices. Each conducting member 31 is secured to the block 27 by a screw 32 and supports a fuse clip or holder 33 at one end and a conductor terminal 34 at the other end. The block 27 has a partition or barrier 35 located between each two adjacent fuse holders. The branch circuit conductors connected to the terminals 34 are led out from the distribution box through suitable openings provided for instance by a knockout 36.

The insulating block 28 carries a number of conducting members 37 secured in place by screws 38 and carrying the fuse clips or holders 39 and the stationary switch contacts 40. A barrier 41 is provided between each two adjacent fuse holders. The barriers 35 and 41 extend toward each other so as to cover the ends of the fuses 42 etc. The block 28 is provided with insulating walls 43 which in effect provide recesses 44 for the switch contacts 40 so that the switch contacts are surrounded by substantial walls of insulating material. Additional insulating protection may be afforded by layers of insulating material such as 45 and 46 arranged around the inner walls of the box adjacent the current carrying portions.

Each of the contact blades 15 is preferably formed of a single piece of metal bent into shape as shown particularly in Fig. 9. This contact member will be seen to be provided at each end with a pair of jaws 50 and 51 united by a web portion 52. Each is mounted in an insulating tube 53 and secured in place in a recess 54 in the insulation 28 by means of a single screw 55 as shown in Fig. 7.

Both of the insulating blocks 27 and 28 are so designed that they can be readily molded of conventional materials.

The movable switch members are carried by the cover by means of an insulating block 57 which is secured to the cover by a number of screws or bolts 58. This block carries a number of U-shaped switch members 59 whose blades are adapted to engage respectively the stationary contacts 40 and 51. The block 28 is provided with a partition 60 between each contact 40 and its companion 51. The wall of this partition is preferably inclined so as to afford sufficient clearance for the movement of the switch member. The block 28 is also provided with insulating walls 61 surrounding the other sides of the opening 62 for the other blade of the switch member 59.

Each switch member 59 is loosely secured to the insulating block 57 in a slot 64 so that the switch member may be tilted somewhat or float and thus be free to take up the most favorable position when the cover is being closed so as to close the circuit. Each slot 64 has shoulders 65 to serve as an abutment for corresponding shoulders 66 on the switch member. The opposite face of the block 57 has recesses 68 affording abutments for lugs 69 which are formed on the end of each switch member. The end 70 of the switch member is formed with these lugs 69 extending in the same plane as the body of the switch member so that the switch member can be inserted into the slot 64 after which the lugs 69 are bent somewhat so as to prevent the withdrawal of the switch member from the block 57.

A separate insulating plate 71 is preferably interposed between the block 57 and the adjacent wall of the cover 18 and is held in place by the screws 58 previously mentioned. Block 57 is preferably provided with ribs 72 between adjacent switch members.

It will be seen that the insulating tube 53 snugly engages the contact blade 15 for the entire length of said tube thus effectively supporting same in relation to the other parts of the switch and insulating the contact from the bottom wall of the box and from the duct wall when the jaw 50 is engaged with a bus duct conductor 12. The tube 53 which positions the blade 15 is seated on a shoulder in recess 54 and the single screw 55 holds both the tube and the blade in position.

I claim:

1. In a branch connector, a box carrying a movable switch member, a terminal in the box formed of a single piece of metal having jaws at one end in the box for engagement by said switch member and jaws at the other end projecting from the box for engaging a bus bar, an insulating sleeve secured in the box and surrounding said terminal, said sleeve for its length being in snug engagement with said terminal for rigidly holding the terminal in the box and a screw fastening the terminal to the sleeve and the sleeve in the box.

2. As an article of manufacture, a duplex contact member comprising an elongated piece of metal bent longitudinally upon itself to form a central semi-cylindrical web portion and spaced side portions and spring jaw members formed on both ends of the side portions, said central web portion being formed with a screw seat for a fastening member.

3. In a branch connector box having an insulating block mounted on its bottom wall, the improvement which includes spaced contact members supported in said block, one of said contact members being formed with jaws on one end to receive a movable contact member and being formed with jaws on the opposite end for engagement with a bus bar, said latter end extending downwardly from the bottom wall surface of the block and projecting outwardly of the box and an insulating sleeve snugly engaging the extending and projecting end of the contact member and having one end rigidly embedded in the insulating block.

4. In a branch connector box having a cover carrying a switch member, the improvement which comprises a terminal in the box formed of a single piece of metal having jaws at one end in the box for engagement by said switch member and jaws at the other end projecting from the box for engaging a bus bar, an insulating sleeve for its entire length surrounding said terminal and snugly engaging same and a single screw for removably securing said sleeve and terminal to the box.

5. In a branch connector having a box with a hinged cover, the improvement comprising an insulating block on the inside of the cover, a bridging contact member loosely carried by said insulating block and including a flat metal plate with spaced prongs adapted to engage spaced box contacts, said plate being formed with shoulders adapted to abut against the insulating block when the bridging contact member is swung into engagement with the box contacts and being formed with twisted lugs adapted to abut against the block when the bridging contact member is being retracted.

6. In a bus duct distribution box having a hinged cover carrying a contact blade extending at substantially right angles to the cover, the improvement comprising an insulating block secured in the box, a connecting member having one end adapted to be engaged by said contact blade when the cover is closed and the other end projecting from a wall of the box for engaging a bus bar in a duct to which the box is secured, an insulating tube mounted in the block and projecting from the box around a portion of the connecting member adjacent the box wall and a single member for securing the tube and the connecting member to the block within the box.

7. In a bus bar duct distribution box having a hinged cover, the improvement consisting of an insulating block carried by the cover, a flat switch member having two contact arms projecting from the block, the shank end of the switch member extending loosely through the block and having at least one part twisted at an angle to the shank of the switch member to hold it loosely in place and a terminal prong secured in the box and having one end projecting from the box to engage a bus bar and the other end extending inwardly to be engaged by one arm of the switch member when the cover is closed.

8. In a power take-off switch, the improvement which comprises an insulating base, an insulating tube mounted in said base having one end extending beyond said base and its other end housed within the base, a connector member mounted in the insulating tube and formed of sheet metal having spaced spring jaws at each end and a central split tube portion and a securing member extending through the base and the insulating tube into the connector, the respective spring jaws extending beyond the opposite ends of the insulating tube for engagement respectively with a switch contact and a bus bar.

9. As an article of manufacture, a connector for a power take-off switch formed of a single piece of metal with spaced resilient contact jaws at its opposite ends connected by a split tube, an insulating tube surrounding the central part of said connector and a screw passing through the insulating tube and into the split tube.

WILLIAM C. ANDERSON.